Oct. 30, 1956     R. M. GANZ     2,768,465
CASTING LURE
Filed July 12, 1955
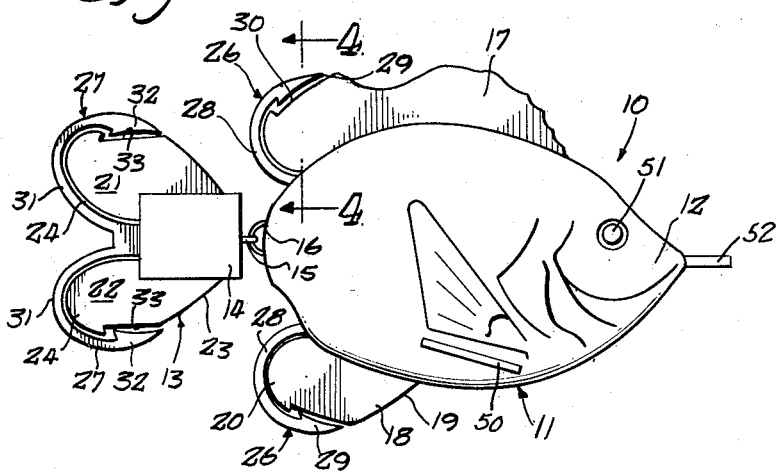
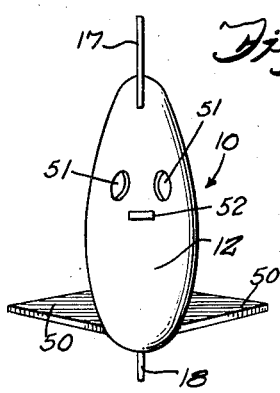
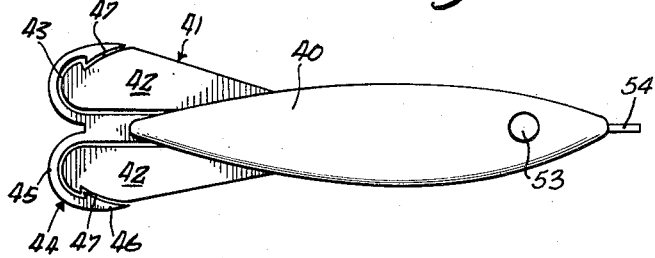
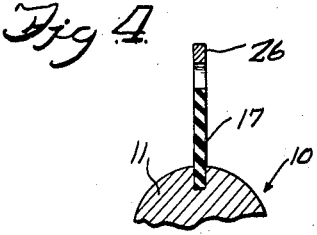
Inventor
Reno M. Ganz
by Hilmond O. Vagil
Attorney

United States Patent Office 2,768,465
Patented Oct. 30, 1956

2,768,465

CASTING LURE

Reno M. Ganz, Chicago, Ill.

Application July 12, 1955, Serial No. 521,547

3 Claims. (Cl. 43—42.4)

This invention relates to a fishing device, such as a casting lure.

Numerous devices have been employed in the past as casting lures, wherein the hooks of the bait are concealed within flexible bodies, or wherein the hooks are disguised by means of feathers or other coverings. These have generally been unsatisfactory, since they have not been natural in appearance and since they were generally ineffective during operation. It is a prime object of this invention to provide an improved casting bait wherein the hooks of the bait are so disposed, relative to certain appendages on a simulated fish body, or artificial lure, that a natural appearance exists in the lure without the hooks being covered; the said appendages being easily displaceable from the hook during striking of the fish so as to effectively hook the same.

A more specific object of this invention is to provide an improved naturally appearing, fish bait of the casting type; the bait having a body to which a plurality of flexible fins are connected; the fins having a shape for accommodating a hook and hook stem so as to blend the hook and stem into the contour of the fins as to seemingly make the parts integral; the fins, however, being sufficiently flexible whereby they are easily displaced to provide clear access to the hook for engaging a fish when the same strikes the bait.

In the drawing:

Figure 1 is a side elevational view of a fish bait device;

Figure 2 is a front view of the device shown in Figure 1;

Figure 3 is a side elevational view of a modified fish bait; and

Figure 4 is a cross-sectional view taken along the line 4—4 of Figure 1.

Referring now to Figures 1, 2, and 4, a preferred embodiment of the invention comprises a simulated fish, or artificial lure, generally designated by the reference character 10. The lure 10 includes a body 11, head 12, and tail 13. The tail 13 comprises a relatively thin rectangular member 14 hingedly connected to the body 11 by means of engaged hinge hooks 15 and 16. The tail 13 is thus positioned for articulation relative to the body 11, so as to simulate natural swimming movement of a fish in the water when the lure is used during casting or trolling.

Appendages, in the form of upper and lower fins 17 and 18, are connected to the body 11. Each appendage, or fin, 17 and 18 respectively includes a leading edge 19 and a curved trailing edge 20. Likewise, the tail 13 has upper and lower flippers, or fins, 21 and 22. These also have leading edges 23 and a curved trailing edge 24. The fins 17, 18, 21, and 22 are made of a thin flexible sheet of material, such as rubber, plastic, etc.

Each of the fins 17, 18, 21, and 22 has a hook element in adjacent relation. The hook elements for the fins 17 and 18 are designated as 26, and the hook elements for the fins 21 and 22 are designated at 27. Each of the elements 26 includes a curved stem 28 connected to the body 11, and a hook point 29 is connected to the stem 28. A recess 30 is provided in the fins 17 and 18; the recesses serving to conform to the hook points 29 and to receive the same, so that the hook stem provides a continuation of the leading and trailing edges.

The hook elements 27 are similar to the hooks 26, comprising a curved stem 31 and a hook point 32. The hook barbs 32 are disposed in recesses 33 which receive the hook barbs 32, so that the outer edges of the hook barbs 32 and stems 31 are flush with the leading edges 23 as shown in Figure 1.

Thus, the hooks and stems conform generally with the contour of the edges of the fins and create the impression that they are integral. The hooks are thus practically hidden, with respect to marine life, and a natural appearance results. When, however, a fish strikes at the lure, the fins are flexible, so that they can be moved away from the hook barbs by the jaws of the fish to catch the same.

In the modification shown in Figure 3, the body 40 has a tail 41 provided with fins 42. The fins 42 have a trailing curved edge 43, and hook elements 44 are connected to the body 40. The hook elements include curved stems 45 and hook points 46 which are disposed in recesses 47 in the fins, conforming to the shape of the hook points.

In Figures 1 and 2, the body 11, is also shown to include laterally extending stabilizing wings 50. Eyes 51 and a leader eyelet 52 are also provided on the body. The modification of Figure 3 also includes eyes 53 (only one of which is shown) and a leader eyelet 54.

Thus it can be seen that an improved lure and modification thereof have been described, and that changes may be made in the construction without departing from the spirit of the invention or scope thereof as defined in the appended claims.

What is claimed is:

1. A fishing plug comprising: a simulated fish having a body, a tail member hingedly connected to said body, said tail having upper and lower fins of flexible material, upper and lower fins on said body, said fins comprising flexible material, each fin having a trailing edge, hook means connected to said body and to said tail member, said hook means comprising a plurality of stems, each stem having an inner substantially concave portion and an outer substantially convex portion, a hook point on one end of each stem, each fin having a recess conforming generally to the shape of the hook point, the inner concave portion of the stem conforming to and being substantially contiguous to the trailing edge of the fin to blend therewith and be protected thereby, the convex portion of each hook up to and including the point being substantially unobstructed, said fins being flexible and movable to be displaced from said hook points to expose the same during engagement of the hook point by a fish.

2. A fishing plug comprising: a simulated fish having a body, upper and lower fins on said body, said fins comprising flexible material, each fin having a trailing edge, hook means connected to said body, said hook means comprising a plurality of stems, each stem having an inner substantially concave portion and an outer substantially convex portion, a hook point on one end of each stem, each fin having a recess conforming generally to the shape of the hook point and the inner concave portion of the stem conforming to and being substantially contiguous to the trailing edge of the fin to blend therewith and be protected thereby, the convex portion of each hook up to and including the point being substantially unobstructed, said fins being flexible and movable to be displaced from said hook points to expose the same during engagement of the hook point by a fish.

3. A fishing plug comprising: a simulated fish having a body, a fin on said body and a tail member, said fin comprising flexible material, said fin having a trailing edge, hook means connected to said body and to said tail member, said hook means comprising a stem, said stem having an inner substantially concave portion and an outer substantially convex portion, a hook point on one end of said stem, said fin having a recess conforming generally to a portion of the hook point, the inner concave portion of the stem conforming to and being substantially contiguous to the trailing edge of the fin to blend therewith and be protected thereby, the convex portion of the hook up to and including the point being substantially unobstructed, said fin being flexible and movable to be displaced from said hook point to expose the same during engagement of the hook point by a fish.

References Cited in the file of this patent

UNITED STATES PATENTS

| | | |
|---|---|---|
| 539,149 | Shattuck | May 14, 1895 |
| 570,632 | Hastings | Nov. 3, 1896 |
| 2,567,787 | Sahutski | Sept. 11, 1951 |
| 2,590,461 | Rasch | Mar. 25, 1952 |